United States Patent
Reddy et al.

[11] Patent Number: 6,026,207
[45] Date of Patent: Feb. 15, 2000

[54] BLACK APPEARING COLOR COATING FOR OPTICAL FIBER AND METHOD USING SAME

[75] Inventors: Srinath S. Reddy, Cornelius; Jeffrey W. Auton, Maiden; Bob J. Overton, Lenoir, all of N.C.

[73] Assignee: Alcatel, France

[21] Appl. No.: 08/859,933

[22] Filed: May 21, 1997

[51] Int. Cl.[7] .............................. G02B 6/02; B05D 5/06
[52] U.S. Cl. ........................ 385/128; 385/123; 385/127; 385/141; 427/162; 427/163.2
[58] Field of Search .................... 385/100, 123, 385/126, 127, 128, 141; 427/162, 163.2

[56] References Cited

U.S. PATENT DOCUMENTS

| | | | |
|---|---|---|---|
| 3,742,107 | 6/1973 | Hawkins | 264/174 |
| 4,482,204 | 11/1984 | Blyler, Jr. et al. | 385/128 X |
| 4,629,285 | 12/1986 | Carter et al. | 385/128 X |
| 4,900,126 | 2/1990 | Jackson et al. | 385/128 X |
| 5,062,685 | 11/1991 | Cain et al. | 385/128 X |
| 5,062,687 | 11/1991 | Sapsford | 385/128 X |
| 5,074,643 | 12/1991 | Petisce | 385/128 |
| 5,111,523 | 5/1992 | Ferlier et al. | 385/100 |
| 5,146,529 | 9/1992 | Mizutani | 385/103 |
| 5,151,306 | 9/1992 | Andrews et al. | 427/434.5 |
| 5,152,817 | 10/1992 | Bennett et al. | 385/128 X |
| 5,164,999 | 11/1992 | Shifflett | 385/12 |
| 5,259,060 | 11/1993 | Edward et al. | 385/128 |
| 5,377,292 | 12/1994 | Bartling et al. | 385/128 |
| 5,381,505 | 1/1995 | Fischietto et al. | 385/128 |
| 5,446,821 | 8/1995 | Nonaka et al. | 385/128 |
| 5,796,905 | 8/1998 | Hoffart et al. | 385/128 |

FOREIGN PATENT DOCUMENTS

| | | | |
|---|---|---|---|
| 0155092 | 9/1985 | European Pat. Off. | 385/128 X |
| 0411310 | 2/1991 | European Pat. Off. | 385/128 X |
| 0501339 | 9/1992 | European Pat. Off. | 385/128 X |
| 8909842 | 11/1989 | Germany | 385/128 X |

OTHER PUBLICATIONS

"EIA Standard Colors for Color Identification and Coding," Electronic Industries Association, Jan. 1985, pp. 1–14.
EIA/TIA Standard Color Coding of Fiber Optic Cables, Electronic Industries Association, Apr. 1992, pp. 1–10.
"Operating Instructions for Fusion Splicer M90/Series 3000," Siecor, Feb. 1995, pp. 1–1 to 1–10.

*Primary Examiner*—Brian Healy
*Attorney, Agent, or Firm*—Ware, Fressola, Van der Sluys & Adolphson LLP

[57] ABSTRACT

A non-carbon black pigment blend is mixed with a coating layer of an optical fiber to provide a black appearing colored optical fiber. The pigment blend does not absorb UV light and is formed by blending three primary colors including red, blue and yellow. The combination of these three primary colors creates a black appearing colored secondary coating. The proportions of the primary colors are controlled to provide the desired shade of black with, in general, no one coloration of pigment exceeding 45% by weight of the total pigment added to the secondary coating. The pigment blend may further include white pigment to provide a slate tone black appearing color. The proportion of white pigment, in general, not exceeding 10 percent by weight of the total pigment added to the secondary coating. The pigment is mixed as a concentrate which is added to a secondary coating layer for application to the optical fiber. Typically, the pigment concentrate is premixed with the secondary coating layer; however, the pigment may also be directly combined with the secondary coating material during application to the optical fiber. The optical fiber may include one or more secondary coating layers, with the pigment concentrate being combined with the outermost secondary coating layer on the optical fiber.

13 Claims, 1 Drawing Sheet

BLACK APPEARING COLOR COATING FOR OPTICAL FIBER AND METHOD USING SAME

TECHNICAL FIELD

The present invention relates to optical fibers, and more particularly to coloration of optical fibers for identification of individual optical fibers.

BACKGROUND OF THE INVENTION

Optical fiber cables containing a plurality of optical fibers for the transmission of optical signals are well known. Such optical fiber cables typically include a core which may have a strength member to carry the axial tensile stress and axial compressive forces on the cable. Also located within the core are one or more tubes. Each tube typically includes a plurality of optical fibers. The optical fibers within a tube may be individually stranded or may be provided in an optical fiber ribbon. A sheath is provided to enclose the core including the tubes and the strength member. The optical fibers included within such a cable typically include a glass core and one or more claddings and/or coatings.

During a process of manufacturing a glass optical fiber, a glass fiber is drawn from a preform and then coated with one or more coating materials, typically ultra-violet light curable materials. The coating materials include, for example, polymeric compositions and are applied by one or more coating applicators. The function of the fiber coating is to protect the surface of the glass optical fiber from mechanical scratches and abrasions which the optical fiber may experience during subsequent handling and use. The coating or coatings also influence the fiber's optical characteristics in response to external mechanical forces and environmental temperature.

Optical fibers are almost universally color-coded in their end use. There are numerous colors which are acceptable in most markets, with additional identification being made possible by "banding" colored fibers with additional colors or circumferential striping. One well-known method of coloring an optical fiber is to apply an ink layer to an optical fiber having single or dual coating layers so that the total composite optical fiber includes primary and secondary coating layers with an outermost ink layer. The ink coloring layer is thin, typically 3 to 5 microns in thickness, and typically includes a carrier resin and a pigment system. The carrier resin may typically be a soluble thermoplastic material or a ultra-violet (UV) curable resin. In the former, the ink is applied via a dye or a transfer method, such as a felt-tip applicator or roller, and the solvent for the carrier resin is driven off by heat to leave the pigmented resin on the fiber. In the UV system, there is no solvent. The liquid resin pigment is cured to a solid state by UV energy. Either ink involves a separate step from either optical fiber production or the cabling operation.

An alternative method for color-coding the fiber is to have the color mixed directly into a secondary (outer) coating of a dual coated optical fiber. The secondary coating acts as the carrier resin for the coloring agents.

One desirable color used for optical fiber coloration is black, and also slate-colored derivations thereof. It is well known in the art to use carbon based black pigment blends in a coloring layer over a fiber having single or dual coating layers to obtain a black or slate color for identification of the optical fiber within a telecommunications cable or ribbon. However, there are several problems associated with using such a carbon based black pigment coloring layer. First, the carbon material absorbs light in the UV region. This presents a potentially significant problem if the primary and secondary coating layers are made of a UV curable material which is not completely cured prior to the application of the color layer. The absorption of UV light by the color layer inhibits a complete cure of the coatings on the optical fiber during drawing of the optical fiber.

A second problem associated with the use of a carbon based black color layer is that the absorption of light by the carbon in the color layer inhibits the use of optical fiber fusion splicing equipment. One well-known method of fusing two lengths of optical fiber is to use a fuse and splice apparatus which automatically aligns and splices two lengths of optical fiber. With the automatic alignment, two lengths of optical fiber to be spliced are bent, for example about a mandril, on either side of the intended splice location. Light is injected into one of the fibers at the location of the bend. The injected light passes through the splice location and is detected at the bend location of the second fiber. The device aligns the fibers for fusion at the splice by determining the alignment of the optical fibers for maximum light transmission. The problem associated with using the carbon black coloring for optical fibers is that the carbon absorbs the injection light, which is typically injected at a wavelength of approximately 1300 nm. This light absorption by the carbon black coloring results in a very weak signal, or no signal, being passed through the fiber for purposes of alignment, thereby aggravating the problems associated with aligning and fusion splicing fibers.

The carbon black coloring materials currently used in the industry are selected to meet the tolerances specified for color distinguishability in industry standards, such as the standards established by the Electronic Industries Association, EIA/TIA-359-A entitled EIA Standard Colors for Color Identification and Coding, January, 1985 and in EIA/TIA-598 entitled Color Coding of Fiber Optic Cables, April 1992. It would be desirable to provide a black appearing coloration for an optical fiber which meets industry requirements for color distinguishability and which does not absorb UV light, thereby allowing the black colored appearing optical fiber to properly cure and to operate with a fusion splicing device which utilizes automatic alignment of fibers by launching UV light into the optical fibers.

SUMMARY OF THE INVENTION

Objects of the invention include a black appearing coloration for an optical fiber, the black appearing coloration being integral with a secondary coating layer of the optical fiber, which does not absorb UV light, thereby allowing for UV curing of primary and secondary coating layers which is not inhibited by the black appearing coloration in the secondary coating layer, and also allowing alignment of segments of optical fiber having the black appearing coloration by injecting light into a side of the fiber.

Another object of the invention is to provide such a black appearing coloration for an optical fiber which meets industry requirements for color distinguishability.

According to the present invention, a non-carbon black pigment blend which does not absorb UV light is formed by blending three primary colors including red, blue and yellow. The combination of these three primary colors creates a black appearing colored secondary coating. The proportions of the primary colors are controlled to provide the desired shade of black with, in general, no one coloration of pigment exceeding 45% by weight of the total pigment added to the secondary coating.

In further accord with the invention, the pigment blend may further include white pigment to provide a slate tone black color. The proportion of white pigment, in general, not exceeding 10 percent by weight of the total pigment added to the secondary coating.

In still further accord with the present invention, the pigment is mixed as a concentrate which is added to a secondary coating layer for application to the optical fiber. Typically, the pigment concentrate is premixed with the secondary coating layer; however, the pigment may also be directly combined with the secondary coating material during application to the optical fiber.

According further to the present invention, the optical fiber may include one or more secondary coating layers, with the pigment concentrate being combined with the outermost secondary coating layer on the optical fiber.

The present invention provides a significant improvement over the prior art. Firstly, a black appearing coloration for an optical fiber is provided which does not absorb UV light. Therefore, the coloration does not inhibit curing of primary and secondary coating layers on an optical fiber if the coloration is applied prior to complete curing of the primary and secondary coatings. Additionally, because the coloration does not absorb UV light, the coloration does not inhibit the alignment of different lengths of optical fiber having the black appearing coloration for fusion splicing by injection of UV light into the optical fiber. A further advantage of the present invention is provided by including the coloration directly in a secondary coating on the optical fiber as opposed to providing a separate color layer on the optical fiber after curing the primary and secondary coatings. Therefore, the manufacturing of the optical fiber is simplified by removing a step, thereby facilitating a more economical production of a black color appearing optical fiber.

The foregoing and other objects, features and advantages of the present invention will become more apparent in light of the following detailed description of exemplary embodiments thereof, as illustrated in the accompanying drawings.

DETAILED DESCRIPTION OF THE INVENTION

The present invention is particularly well suited for providing a black appearing coloration for an optical fiber without the need for using a carbon-black pigment coloration in order to achieve the desired black appearing coloration. As is well known in the art, carbon-black pigment is typically used to produce a black colored optical fiber. Carbon-black pigment is a carbon based pigment concentrate which is well known in the industry for providing a black coloration for an optical fiber. The black appearing coloration of the present invention is provided by including a non-carbon-black pigment concentrate in a secondary coating layer of the optical fiber. The coloration does not inhibit curing of the coating layers on the optical fiber and also does not preclude the injection of light through a side of the fiber for purposes of alignment and splicing. As used herein, the terms "black appearing coloration," "black appearing color" and like phrases are intended to include both black and slate-colored derivations thereof (slate-black). The black appearing coloration of the invention meets industry requirements for color distinguishability.

Figure 1:
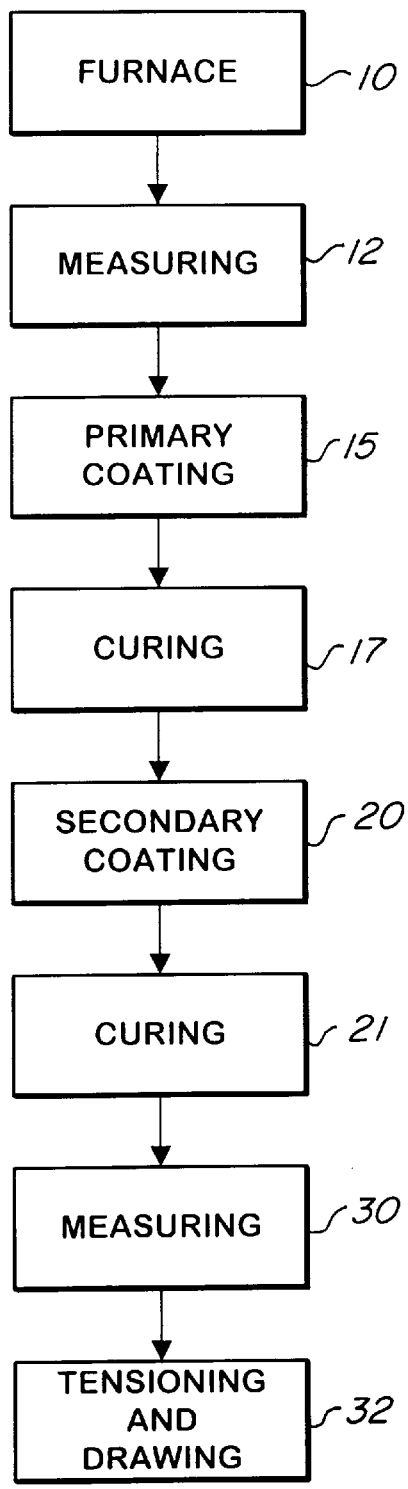
FIG. 1 is a schematic block diagram of a draw tower used to produce an optical fiber in accordance with the present invention.

Referring to FIG. 1, a schematic block diagram showing a typical draw tower is provided. The draw tower is usually a vertical arrangement wherein a preform (not shown) is introduced into a furnace 10 such that an optical fiber can be drawn from a heated end of the preform. The composition of the preform will largely depend upon the type of optical fiber desired (single mode, multimode, dispersion shifted, etc.) After exiting the furnace, the optical fiber may be passed through measuring devices 12 which may measure the diameter and the tension of the optical fiber being drawn from the preform. Next the optical fiber passes through a primary coating apparatus 15, such as a coating die, wherein a coating is applied to the optical fiber. The coating may be a UV curable resin, a thermosetting resin, a radiation curable resin, or other suitable coating known in the art for providing the desired mechanical properties to the surface of the optical fiber. After exiting the primary coating device 15, the optical fiber enters a curing stage 17 wherein the primary coating is at least partially cured. For example, if the primary coating is a UV curable coating, the curing stage 15 includes a UV light source for exposing the primary coating to UV light for curing the primary coating. Alternatively, if the primary coating is a thermosetting resin, the primary coating is exposed to a heat source. As will be understood by those skilled in the art, the curing stage 15 will provide the desired environment or conditions for curing of the primary coating.

Typically, optical fibers are provided with at least two coating layers. Each coating layer is selected to have certain desirable mechanical properties. The primary coating is typically selected to have a relatively low Young's modulus to provide cushioning support for the fiber and to act as a buffer or shock absorber. The secondary coating layer is selected to have a higher Young's modulus to provide a hard protective layer for the complete fiber.

Figure 2:
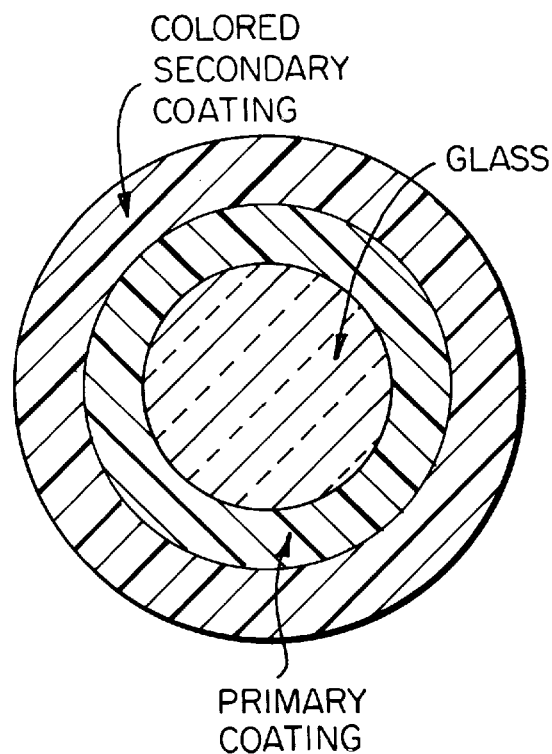
FIG. 2 is a cross-sectional view of an optical fiber having a primary cladding and a black colored secondary cladding of the present invention.

After exiting the first curing stage 17, the optical fiber coated with the primary coating is provided to additional coating and curing stages 20, 21 respectively wherein one or more secondary coatings are added to the fiber. After the final cure stage, the coated optical fiber may be passed through a measuring device 30 wherein the final outside diameter of the coated optical fiber is measured. Finally, the coated optical fiber is provided to a tensioning and drawing device 32 wherein the coated optical fiber is drawn out of the drawing tower and provided to a take up spool (not shown). The coated optical fiber may pass over one or more pulleys before being provided to the take up spool. The tensioning and drawing of the optical fiber may be accomplished in a suitable way known in the art, such as is disclosed in commonly owned, copending patent application Ser. No. 08/588,974, filed on Jan. 19, 1996, the disclosure of which is incorporated herein by reference, with particular reference to FIG. 2 and the accompanying description.

In accordance with the present invention, the outermost secondary coating is mixed with a pigment concentrate, which includes a combination of pigments, to provide the black appearing colored optical fiber of the invention. In particular, the entire secondary coating layer is pigmented with a combination of pigments to provide a black appearing colored secondary coating. Several shades of black, ranging from a slate-black color to a deep purplish black color can be achieved, depending on the relative proportions and the type of pigment used to form the pigment concentrate.

Several fibers having a black appearing color where achieved by combining red, blue, yellow and white pigment in a concentrate and premixing this pigment concentrate with the secondary coating prior application of the secondary coating to the optical fiber. The pigments were selected to be organic pigment material well known in the art having a typical particle size of less then 2 microns, with the maximum size of any particle being less than 5 microns. Organic base pigments were selected such that the pigment is not susceptible to bleeding or migration when exposed to filling and flooding compounds utilized in optical fiber cables. As is know in the art, such filling and flooding compounds are used as water blocking agents within optical fibers and come in direct contact with the surface of the optical fibers within an optical fiber cable. The amount of pigment added to the secondary coating is selected to provide the desired final black appearing color. Typically, the pigment concentrate makes up between about 0.10% to 5% of the total secondary coating material after premixing of the pigment concentrate with the secondary coating, depending upon the final color desired.

Several examples of pigment concentrate combinations found to be suitable for use as a black appearing coloration for secondary coatings of an optical fiber are listed in Table II below:

TABLE II

PIGMENT CONCENTRATE EXAMPLES

| EXAMPLE | % RED PIGMENT | % BLUE PIGMENT | % YELLOW PIGMENT | % WHITE PIGMENT |
|---|---|---|---|---|
| EXAMPLE 1 PURPLISH BLACK | 38 | 32 | 30 | 0 |
| EXAMPLE 2 BROWNISH BLACK | 36 | 34 | 30 | 0 |
| EXAMPLE 3 BLACK | 39 | 34 | 27 | 0 |
| EXAMPLE 4 SLATE (DARK) | 38 | 32 | 30 | 0 |
| EXAMPLE 5 SLATE | 33.5 | 32 | 33 | 0.5 |
| EXAMPLE 6 SLATE | 34 | 32 | 33 | 1 |
| EXAMPLE 7 SLATE (LIGHT) | 36 | 31 | 30 | 3 |

In general, the percentage of each pigment should meet the following guide line: ≦45% red; ≦45% blue; ≦45% yellow; ≦10% white. The visually perceived shade of chromatic black and slate will vary according to the percentage of each pigment used in the pigment concentrate.

The pigment concentrates in the above examples were successful in producing black appearing colored optical fibers. The above example fibers were found to have a complete cure of the primary and secondary coatings, and were completely compatible with a fusion splicing device, resulting in less than 0.01 dB/km of attenuation after splicing lengths of the example fibers. The fibers produced had values of lightness (L), chroma (C) and hue (H) to thereby produce the visual appearance of black and slate meeting the requirements of the standards established by the Electronic Industries Association, EIA/TIA-359-A entitled EIA Standard Colors for Color Identification and Coding, January, 1985 and in EIA/TIA-598 entitled Color Coding of Fiber Optic Cables, April 1992. Table II below provides typical LCH values for the example fibers listed in Table I:

TABLE I

TYPICAL LCH VALUES

| COLOR | L | C | H |
|---|---|---|---|
| BROWNISH BLACK | 0–35 | 0–20 | 320–360 |
| PURPLISH BLACK | 0–35 | 0–20 | 300–340 |
| SLATE | 35–80 | 0–10 | 60–140 |

Although the invention is described herein as utilizing a single secondary coating, the invention will work equally as well with an optical fiber having a plurality of secondary coatings. All that is required is that the color concentrate be combined with the outermost secondary coating in order to provide an optical fiber of the desired black appearing coloration. Additionally, in an optical fiber having only a single, primary coating, the pigment concentrate of the invention may be directly combined with the primary coating in order to provide the desired black appearing colored optical fiber.

Although the present invention has been described and illustrated with respect to exemplary embodiments thereof, the foregoing the various other additions and deletions may be made therein and thereto without departing from the spirit and scope of the present invention.

What is claimed is:

1. A pigment concentrate for combination with an outermost coating layer of an optical fiber for producing a black appearing colored optical fiber, comprising:

a blend of primary color pigment concentrates including red pigment concentrate, blue pigment concentrate and yellow pigment concentrate;

wherein no carbon-black pigment is included in said blend of primary color pigment concentrates; and wherein said primary color pigment concentrates are selected such that said blend of primary color pigment concentrates added to the outermost coating of an optical fiber does not absorb ultra-violet light.

2. The pigment concentrate of claim 1, wherein no one primary color pigment concentrate exceeds 45% by weight of said blend of primary color pigment concentrates.

3. The pigment concentrate of claim 2, further comprising a white pigment concentrate.

4. The pigment concentrate of claim 3, wherein said white pigment concentrate does not exceed 10% by weight of said blend of primary color pigment concentrates.

5. A method for forming an optical fiber having a black appearing coloration including the steps of:

providing an outermost coating layer to be applied to the optical fiber;

providing a blend of primary color pigment concentrates including red pigment concentrate, blue pigment concentrate and yellow pigment concentrate, wherein no carbon-black pigment is included in the pigment concentrate;

selecting said primary color pigment concentrates such that said blend of pigment concentrates does not absorb ultra-violet light;

combining said blend of primary color pigment concentrates with the outermost coating layer prior to application of the outermost coating layer to the optical fiber; and applying the combined outermost coating layer and blend of primary color pigment concentrates to the optical fiber.

6. The method of claim 5, further including the step of combining said primary color concentrates to form said blend of primary color pigment concentrates such that no one primary color pigment concentrate exceeds 45% by weight of said blend of primary color pigment concentrates.

7. The method of claim 6, further including the step of blending a white pigment concentrate with said blend of primary color pigment concentrates.

8. The method of claim 7, wherein said white pigment concentrate does not exceed 10% by weight of said blend of primary color pigment concentrates.

9. A black appearing color coating layer for an optical fiber, comprising:
- a coating material for providing a coating layer on an optical fiber;
- a blend of primary color pigment concentrates which is added to said coating material, the combination of said coating material and said blend of primary color pigments forming a black appearing color coating for an optical fiber;
- wherein no carbon-black pigment is included in said blend of primary color pigment concentrates; and
- wherein said primary color pigment concentrates are selected such that said blend of primary color pigment concentrates does not absorb ultra-violet light.

10. A black appearing color coating layer for an optical fiber as claimed in claim 9, wherein said blend of primary color pigment concentrates includes red pigment concentrate, blue pigment concentrate and yellow pigment concentrate.

11. A black appearing color coating layer for an optical fiber as claimed in claim 10, wherein no one primary color pigment concentrate exceeds 45% by weight of said blend of primary color pigment concentrates.

12. A black appearing color coating layer for an optical fiber as claimed in claim 11, wherein said primary color pigment concentrate further includes a white pigment concentrate.

13. A black appearing color coating layer for an optical fiber as claimed in claim 12, wherein said white pigment concentrate does not exceed 10% by weight of said primary color pigment concentrate.

* * * * *